United States Patent
Kikuchi et al.

(10) Patent No.: US 9,413,570 B2
(45) Date of Patent: Aug. 9, 2016

(54) MOBILE TERMINAL TEST DEVICE AND MOBILE TERMINAL TEST METHOD

(71) Applicant: ANRITSU CORPORATION, Atsugi-shi, Kanagawa (JP)

(72) Inventors: Kengo Kikuchi, Kanagawa (JP); Shigeharu Arai, Kanagawa (JP); Koji Fukazawa, Kanagawa (JP); Takaaki Kamisawa, Kanagawa (JP); Masayuki Shimizu, Kanagawa (JP); Yoshitaka Kihara, Kanagawa (JP)

(73) Assignee: ANRITSU CORPORATION, Atsugi-Shi (JP)

( * ) Notice: Subject to any disclaimer, the term of this patent is extended or adjusted under 35 U.S.C. 154(b) by 79 days.

(21) Appl. No.: 14/595,304

(22) Filed: Jan. 13, 2015

(65) Prior Publication Data

US 2015/0215140 A1    Jul. 30, 2015

(30) Foreign Application Priority Data

Jan. 29, 2014  (JP) ................................ 2014-014181

(51) Int. Cl.
| | |
|---|---|
| *H04L 25/08* | (2006.01) |
| *H04L 5/14* | (2006.01) |
| *H04L 12/26* | (2006.01) |
| *H04W 24/06* | (2009.01) |
| *H04W 88/02* | (2009.01) |

(52) U.S. Cl.
CPC .............. *H04L 25/085* (2013.01); *H04L 5/143* (2013.01); *H04L 5/1423* (2013.01); *H04L 43/50* (2013.01); *H04W 24/06* (2013.01); *H04W 88/02* (2013.01)

(58) Field of Classification Search
None
See application file for complete search history.

(56) References Cited

U.S. PATENT DOCUMENTS

| | | | | |
|---|---|---|---|---|
| 6,294,952 B1* | 9/2001 | Kato | ..................... | H03D 1/2245 329/306 |
| 6,314,083 B1* | 11/2001 | Kishimoto | .......... | H04L 27/2657 370/210 |
| 6,334,051 B1* | 12/2001 | Tsurumi | ................ | H03D 7/166 375/316 |
| 2002/0064237 A1* | 5/2002 | Shibata | ..................... | H03C 3/40 375/302 |
| 2006/0014513 A1* | 1/2006 | Uozumi | ............... | H03C 3/0925 455/323 |
| 2011/0043277 A1* | 2/2011 | Sakamoto | ........... | H04L 27/3863 329/306 |
| 2012/0256673 A1* | 10/2012 | Fujibayashi | .......... | H04L 27/366 327/238 |

(Continued)

FOREIGN PATENT DOCUMENTS

| | | |
|---|---|---|
| JP | 2010147657 A | 7/2010 |
| JP | 2012-100127 A | 5/2012 |
| JP | 2013165335 A | 8/2013 |

*Primary Examiner* — Candal Elpenord
(74) *Attorney, Agent, or Firm* — Pearne & Gordon LLP

(57) ABSTRACT

Frequency comparison means compares the levels of uplink (UL) and downlink (DL) frequencies which are designated by frequency designation means. When it is determined that the UL frequency is lower than the DL frequency, heterodyne switching means enables a receiving unit to perform frequency conversion using a lower-side heterodyne system and signal processing is performed, using one baseband signal and the other baseband signal obtained by a quadrature demodulation process as an in-phase component and a quadrature component, respectively. When it is determined that the UL frequency is higher than the DL frequency, the heterodyne switching means enables the receiving unit to perform the frequency conversion using an upper-side heterodyne system and signal processing is performed, using the one baseband signal and the other baseband signal obtained by the quadrature demodulation process as the quadrature component and the in-phase component, respectively.

8 Claims, 8 Drawing Sheets

(56) References Cited

U.S. PATENT DOCUMENTS

2013/0034185 A1* 2/2013 Oka .................... H04B 1/0475 375/296

2014/0177531 A1* 6/2014 Imamura ............... H04W 24/10 370/328

2014/0226701 A1* 8/2014 Pennisi .................... H04L 1/02 375/219

* cited by examiner

| Operating band | UL frequency band (MHz) | DL frequency band (MHz) |
|---|---|---|
| 1 | 1920~1980 | 2110~2170 |
| 2 | 1850~1910 | 1930~1990 |
| 3 | 1710~1785 | 1805~1880 |
| 4 | 1710~1755 | 2110~2155 |
| 5 | 824~849 | 869~894 |
| 6 | 830~840 | 875~885 |
| 7 | 2500~2570 | 2620~2690 |
| 8 | 880~915 | 925~960 |
| 9 | 1749.9~1784.9 | 1844.9~1879.9 |
| 10 | 1710~1770 | 2110~2170 |
| 11 | 1427.9~1447.9 | 1475.9~1495.9 |
| 12 | 699~716 | 729~746 |
| 13 | 777~787 | 746~756 |
| 14 | 788~798 | 758~768 |
| 15 | Reserve | Reserve |
| 16 | Reserve | Reserve |
| 17 | Reserve | Reserve |
| 18 | Reserve | Reserve |
| 19 | 830~845 | 875~890 |
| 20 | 832~862 | 791~821 |
| 21 | 1447.9~1462.9 | 1495.9~1510.9 |

FIG. 9

MOBILE TERMINAL TEST DEVICE AND MOBILE TERMINAL TEST METHOD

TECHNICAL FIELD

The present invention relates to a technique for communicating with a mobile terminal, such as a mobile phone or a smartphone, using a frequency division duplex (FDD) system to perform various tests for the mobile terminal, and more particularly, to a technique that prevents interference due to the leakage of a downlink (hereinafter, referred to as DL) radio-frequency signal which is output from a test device at the same time as the reception time of an uplink (hereinafter, referred to as UL) radio-frequency signal transmitted from a mobile terminal when heterodyne conversion is performed to convert the UL radio-frequency signal into a signal in an intermediate frequency band which can be digitally processed.

BACKGROUND ART

As shown in FIG. 7, in the communication based on the FDD system, a base station transmits a DL signal with a frequency f(DL) in a DL frequency band which is defined in a predetermined operating band and a mobile terminal transmits a UL signal with a frequency f(UL) in a UL frequency band which is defined to be different from the DL frequency band.

Here, in the actual communication between the base station and the mobile terminal, a difference between the DL frequency f(DL) and the UL frequency f(UL) is defined for each operating band. A test device for testing the mobile terminal needs to check the operation of the mobile terminal at frequencies other than the frequency difference defined for each operating band. Therefore, the frequencies f(DL) and f(UL) can be arbitrarily set to at least the DL frequency band and the UL frequency band, respectively.

FIG. 8 shows the structure of a test device 10 for testing a mobile terminal 1 based on the FDD system. A DL radio-frequency signal RF(DL) with a frequency f(DL) which is output from a transmitting unit 11 is sent to the mobile terminal 1 to be tested through a coupler 12. A receiving unit 13 receives a UL radio-frequency signal RF(UL) with a frequency f(UL) which is output from the mobile terminal 1 through the coupler 12.

In the receiving unit 13, a mixer 13b mixes an input radio-frequency signal with a local signal L output from a local signal generator 13a. A low-pass filter 13c performs a high-frequency cutoff process on the output from the mixer 13b and performs heterodyne conversion to convert the input signal into a signal with a frequency in an intermediate frequency band which can be digitally processed. Then, an A/D converter 13d converts the converted signal IF(UL) into a digital signal string IFD(UL) and outputs the digital signal string IFD(UL) to a test processing unit 15.

The test processing unit 15 performs various kinds of signal processing including baseband conversion and data demodulation on the output from the receiving unit 13, generates a signal required for the test, for example, a signal IFD(DL) in the intermediate frequency band which is quadrature-modulated with a baseband signal, and sends the generated signal to the transmitting unit 11.

As described above, in the FDD system, since DL and UL are performed at the same time, some DL radio-frequency signals RF(DL)' among the DL radio-frequency signals RF(DL) output from the transmitting unit 11 leak to the receiving unit 13.

Here, in the FDD mobile communication system, recently, there have been 21 operating bands which are defined in the range of about 700 MHz to 2700 MHz, as shown in FIG. 9. The base station and the mobile terminal transmit and receive signals in a UL frequency band and a DL frequency band of any of the operating bands (however, operating bands 15 to 18 are reserve bands).

The input band of the receiving unit 13 in the test device needs to be wide in order to respond to the many operating bands set in the wide frequency range. As described above, even when the directional coupler 12 is used between the transmitting unit 11 and the receiving unit 13, sufficient isolation is not obtained. The high-level DL leakage component RF(DL)' and the UL radio-frequency signal RF(UL) are input to the receiving unit 13 at the same time.

In general, the receiving unit 13 of the test device 10 performs heterodyne conversion with a lower-side heterodyne system using a local signal L with a frequency f(L) that is lower than a reception frequency (band center frequency) by a predetermined frequency f(IF) (for example, 5 MHz) such that the frequency of the UL signal is converted into a frequency in the intermediate frequency band while the relationship between the frequency levels in the UL signal band is maintained.

Here, an example of operating band 8 in which the DL frequency band (925 MHz to 960 MHz) is higher than the UL frequency band (880 MHz to 915 MHz) will be described. As shown in FIG. 10(a), when a signal with an upper limit frequency f(UL) of 912.5 MHz in the UL frequency band is used as a UL signal with a frequency width of 5 MHz, the frequency f(L) of the local signal L is 907.5 MHz, which is 5 MHz lower than the upper limit frequency f(UL).

It is assumed that a DL signal with a frequency in the range of 5 MHz from a frequency f(DL) of 927.5 MHz which is closest to the frequency of the UL signal in the DL frequency band is transmitted.

When the UL signal RF(UL) with a frequency of 912.5 MHz and the DL leakage component RF(DL)' with a frequency of 927.5 MHz are input to the receiving unit 13 and are subjected to lower-side heterodyne frequency conversion with the local signal L with a frequency f(L) of 907.5 MHz, the UL radio-frequency signal RF(UL) is converted into a signal IF(UL) with a frequency of 5 MHz and the DL leakage component RF(DL)' is converted into a signal IF(DL) with a frequency of 20 MHz, as shown in FIG. 10(b).

Therefore, as shown in FIG. 10(b), when the cutoff frequency of the low-pass filter 13c is set to, for example, about 15 MHz, it is possible to remove the adverse effect of the DL leakage component on signal processing after the A/D conversion process.

The example of operating band 8 is an example in which the gap between the UL frequency band and the DL frequency band is the narrowest (10 MHz) which is the worst possible condition when the UL frequency band is lower than the DL frequency band. Therefore, when the UL frequency band is lower than the DL frequency band and both the UL and DL signal bands are about 5 MHz, lower-side heterodyne frequency conversion is performed for a UL reception frequency with a local signal with the frequency in the above-mentioned numerical example in order to remove the influence of the DL leakage component.

That is, in many operating bands in which the UL frequency band is set to be lower than the DL frequency band, when the lower-side heterodyne frequency conversion is performed using the above-mentioned frequency relationship, signal processing is hardly affected by the DL leakage component.

However, as in operating bands 13, 14, and 20 shown in FIG. 9, when the UL frequency band is higher than the DL frequency band and the lower-side heterodyne system is used similarly to the above, the DL leakage component enters the band of the low-pass filter 13c.

For example, in operating band 20, as shown in FIG. 11(a), when a DL signal (center frequency: 818.5 MHz) having a frequency in the range of 5 MHz from the upper limit of the DL frequency band (791 MHz to 821 MHz) is used and a UL signal (center frequency: 834.5 MHz) having a frequency in the range of 5 MHz from the lower limit of the UL frequency band (832 MHz to 862 MHz) is used, the frequency f(L) of the local signal L is 829.5 MHz.

When heterodyne conversion is performed with the local signal L, the UL radio-frequency signal RF(UL) is converted into a signal IF(UL) with a frequency of 5 MHz and the DL leakage component RF(DL)' is converted into a signal IF(DL) with a negative frequency (−11 MHz), as shown in FIG. 11(b). As the actual signal, the signal IF(DL) is symmetrically transferred with respect to a frequency of 0 and appears as a signal IF(DL)' with a positive frequency of 11 MHz. The transferred signal IF(DL)' enters the passband of the low-pass filter 13c.

Here, when the DL leakage component RF(DL)' has a high signal level, the A/D converter 13d is saturated or the dynamic range is narrowed by the leakage component even though the A/D converter 13d is not saturated. As a result, it is difficult to measure, for example, the power control of the UL signal.

Patent Document 1 discloses a technique for testing a mobile terminal in a different communication system, for example, a time division duplex (TDD) system. The technique controls the power of a transmission signal output from a test device to solve an interference problem in a structure in which a transmitting unit and a receiving unit are connected to each other through a coupler. However, in the technique, it is difficult to prevent the influence of the leakage of the DL signal which is output from the mobile terminal in the FDD system at the same time as the UL signal.

RELATED ART DOCUMENT

Patent Document

[Patent Document 1] Japanese Unexamined Patent Application Publication No. 2012-100127

DISCLOSURE OF THE INVENTION

Problem That the Invention is to Solve

As a method for solving the above-mentioned problems, a method is considered which reduces the cutoff frequency of the low-pass filter 13c to, for example, about 10 MHz in order to remove the transferred signal IF(DL)' of the DL leakage component.

However, the FDD system uses a dual carrier system which can double the UL or DL signal band for one user. As described above, when the cutoff frequency of the low-pass filter 13c is reduced to about 10 MHz, some of the UL signals are lost.

In the dual carrier system, when the bandwidth of the UL signal is extended from 5 MHz to 10 MHz, the band of the signal IF(UL) is extended to 10 MHz and overlaps the transferred signal IF(DL)' of the DL leakage component on the frequency axis, as shown in FIG. 11(c). In this state, it is difficult to separate both signals from the A/D-converted data and it is impossible to test the UL signal.

The invention has been made in order to solve the above-mentioned problems and an object of the invention is to provide a mobile terminal test device and a mobile terminal test method that can reduce the influence of a DL leakage component for all operating bands when UL and DL signals are transmitted to or received from a mobile terminal to be tested in an FDD system.

Means for Solving the Problem

In order to achieve the object, according to a first aspect of the invention, a mobile terminal test device includes: frequency designation means (31) for designating an uplink frequency and a downlink frequency which are used for communication based on an FDD system with a mobile terminal to be tested; a transmitting unit (21) that outputs a downlink signal to be sent to the mobile terminal with the designated frequency; a coupler (22) that sends the downlink signal output from the transmitting unit to the mobile terminal and inputs an uplink signal output from the mobile terminal; a receiving unit (23) that mixes the uplink signal input through the coupler with a first local signal which has a predetermined frequency difference from the designated uplink frequency, performs a high-frequency cutoff process on the mixed component, performs heterodyne conversion on the input uplink signal to convert a frequency of the input uplink signal into a frequency in an intermediate frequency band including the predetermined frequency, converts the heterodyne-converted signal into a digital signal string, and outputs the digital signal string; a quadrature demodulator (32) that multiplies the output from the receiving unit by second and third local signals which have a frequency equal to the predetermined frequency and have a phase difference of 90 degrees therebetween and outputs baseband signals which are orthogonal to each other; a baseband processing unit (33) that receives the baseband signals orthogonal to each other which are output from the quadrature demodulator as an in-phase component and a quadrature component of a baseband signal obtained by modulating the uplink radio-frequency signal and performs signal processing required for testing the mobile terminal; frequency comparison means (41) for comparing the levels of the uplink and downlink frequencies designated by the frequency designation means; heterodyne switching means (42) for setting a frequency of the first local signal to be lower than the uplink frequency by the predetermined frequency such that frequency conversion is performed by a lower-side heterodyne system when the frequency comparison means determines that the uplink frequency is lower than the downlink frequency; and for setting the frequency of the first local signal to be higher than the uplink frequency by the predetermined frequency such that frequency conversion is performed by an upper-side heterodyne system when the frequency comparison means determines that the uplink frequency is higher than the downlink frequency; and baseband switching means (43) for outputting one baseband signal obtained by the multiplication of the second local signal by the quadrature demodulator and the other baseband signal obtained by the multiplication of the third local signal by the quadrature demodulator as an in-phase component and a quadrature component to the baseband processing unit, respectively, when the frequency comparison means determines that the uplink frequency is lower than the downlink frequency; and for outputting the one baseband signal and the other baseband signal obtained by the quadrature demodulator as the quadrature component and the in-phase component to the baseband processing unit, respectively, when the frequency comparison means determines that the uplink frequency is higher than the downlink frequency.

According to a second aspect of the invention, in the mobile terminal test device according to the first aspect, the quadrature demodulator may output a first signal obtained by multiplying the output from the receiving unit by the second local signal and output a second signal obtained by multiplying the output from the receiving unit by the third local signal. When the frequency comparison means determines that the uplink frequency is lower than the downlink frequency, the baseband switching means may output the first signal and the second signal as the in-phase component and the quadrature component to the baseband processing unit, respectively. When the frequency comparison means determines that the uplink frequency is higher than the downlink frequency, the baseband switching means may output the first signal and the second signal as the quadrature component and the in-phase component to the baseband processing unit, respectively.

According to a third aspect of the invention, in the mobile terminal test device according to the first aspect, when the frequency comparison means determines that the uplink frequency is lower than the downlink frequency, the baseband switching means may output the baseband signal obtained by the multiplication of the output from the receiving unit and the second local signal by the quadrature demodulator and the baseband signal obtained by the multiplication of the output from the receiving unit and the third local signal by the quadrature demodulator as the in-phase component and the quadrature component to the baseband processing unit, respectively. When the frequency comparison means determines that the uplink frequency is higher than the downlink frequency, the baseband switching means may output the baseband signal obtained by the multiplication of the output from the receiving unit and the third local signal by the quadrature demodulator and the baseband signal obtained by the multiplication of the output from the receiving unit and the second local signal by the quadrature demodulator as the in-phase component and the quadrature component to the baseband processing unit, respectively.

According to a fourth aspect of the invention, in the mobile terminal test device according to the first aspect, the communication based on the FDD system is communication based on a dual carrier system.

According to fifth aspect of the invention, a mobile terminal test method includes: a step of designating an uplink frequency and a downlink frequency which are used for communication based on an FDD system with a mobile terminal to be tested; a step of giving a downlink signal with the designated frequency to the mobile terminal, mixing an uplink signal output from the mobile terminal with a first local signal which has a predetermined frequency difference from the designated uplink frequency, performing a high-frequency cutoff process on the mixed component, performing heterodyne conversion on the uplink signal to convert a frequency of the uplink signal into a frequency in an intermediate frequency band including the predetermined frequency, converting the heterodyne-converted signal into a digital signal string, and outputting the digital signal string; a step of multiplying the digital signal string by second and third local signals which have a frequency equal to the predetermined frequency and have a phase difference of 90 degrees therebetween and outputting baseband signals which are orthogonal to each other; a step of performing signal processing required for testing the mobile terminal, using the baseband signals which are orthogonal to each other as an in-phase component and a quadrature component of a baseband signal obtained by modulating the uplink radio-frequency signal; a step of comparing the levels of the designated uplink and downlink frequencies; and a step of setting a frequency of the first local signal to be lower than the uplink frequency by the predetermined frequency such that frequency conversion is performed by a lower-side heterodyne system and performing signal processing required for the test, using one baseband signal obtained by the multiplication of the second local signal and the other baseband signal obtained by the multiplication of the third local signal in the step of outputting the baseband signals orthogonal to each other as an in-phase component and a quadrature component, respectively, when it is determined in the step of comparing the levels of the frequencies that the uplink frequency is lower than the downlink frequency; and of setting the frequency of the first local signal to be higher than the uplink frequency by the predetermined frequency such that frequency conversion is performed by an upper-side heterodyne system and performing the signal processing required for the test, using the one baseband signal and the other baseband signal obtained in the step of outputting the baseband signals orthogonal to each other as the in-phase component and the quadrature component, respectively, when it is determined in the step of comparing the levels of the frequencies that the uplink frequency is higher than the downlink frequency.

According to a sixth aspect of the invention, in the mobile terminal test method according to the fifth aspect, the step of outputting the baseband signals orthogonal to each other may output a first signal obtained by multiplying the digital signal string by the second local signal and output a second signal obtained by multiplying the digital signal string by the third local signal. When it is determined in the step of comparing the levels of the frequencies that the uplink frequency is lower than the downlink frequency, the step of performing the signal processing required for the test may perform the signal processing required for the test, using the first signal and the second signal as the in-phase component and the quadrature component, respectively. When it is determined in the step of comparing the levels of the frequencies that the uplink frequency is higher than the downlink frequency, the step of performing the signal processing required for the test may perform the signal processing required for the test, using the first signal and the second signal as the quadrature component and the in-phase component, respectively.

According to a seventh aspect of the invention, in the mobile terminal test method according to the fifth aspect, when it is determined in the step of comparing the levels of the frequencies that the uplink frequency is lower than the downlink frequency, the step of performing the signal processing required for the test may perform the signal processing required for the test, using the baseband signal obtained by the multiplication of the digital signal string and the second local signal and the baseband signal obtained by the multiplication of the digital signal string and the third local signal as the in-phase component and the quadrature component, respectively. When it is determined in the step of comparing the levels of the frequencies that the uplink frequency is higher than the downlink frequency, the step of performing the signal processing required for the test may perform the signal processing required for the test, using the baseband signal obtained by the multiplication of the digital signal string and the third local signal and the baseband signal obtained by the multiplication of the digital signal string and the second local signal as the in-phase component and the quadrature component, respectively.

According to an eighth aspect of the invention, in the mobile terminal test method according to the fifth aspect, the communication based on the FDD system may be communication based on a dual carrier system.

Advantage of the Invention

As such, in the invention, the levels of the designated uplink and downlink frequencies are compared with each other. When it is determined that the uplink frequency is lower than the downlink frequency, the frequency of the uplink signal is converted by the lower-side heterodyne system and signal processing is performed, using one of the baseband signals obtained by a quadrature demodulation process and the other baseband signal as the in-phase component and the quadrature component, respectively. When it is determined that the uplink frequency is higher than the downlink frequency, the frequency of the uplink signal is converted by the upper-side heterodyne system and signal processing is performed, using one of the baseband signals obtained by the quadrature demodulation process and the other baseband signal as the quadrature component and the in-phase component, respectively.

Therefore, in all of the operating bands allocated to the FDD mobile communication system, a downlink leakage component converted into an intermediate frequency band and an uplink component are converted into the positive or negative frequency domain so as not to overlap each other. In addition, the frequency difference therebetween is absolutely equal to or greater than a gap between an uplink frequency band and a downlink frequency band of the operating band, regardless of the bandwidth of the signal. Therefore, it is possible to accurately extract the uplink signal, without changing a higher cutoff frequency in the receiving unit, and to reliably test the mobile terminal based on the FDD system.

BRIEF DESCRIPTION OF THE DRAWINGS

FIG. 9 is a diagram illustrating the operating bands of mobile communication using the FDD system.

BEST MODE FOR CARRYING OUT THE INVENTION

Hereinafter, an embodiment of the invention will be described with reference to the drawings.

Figure 1:
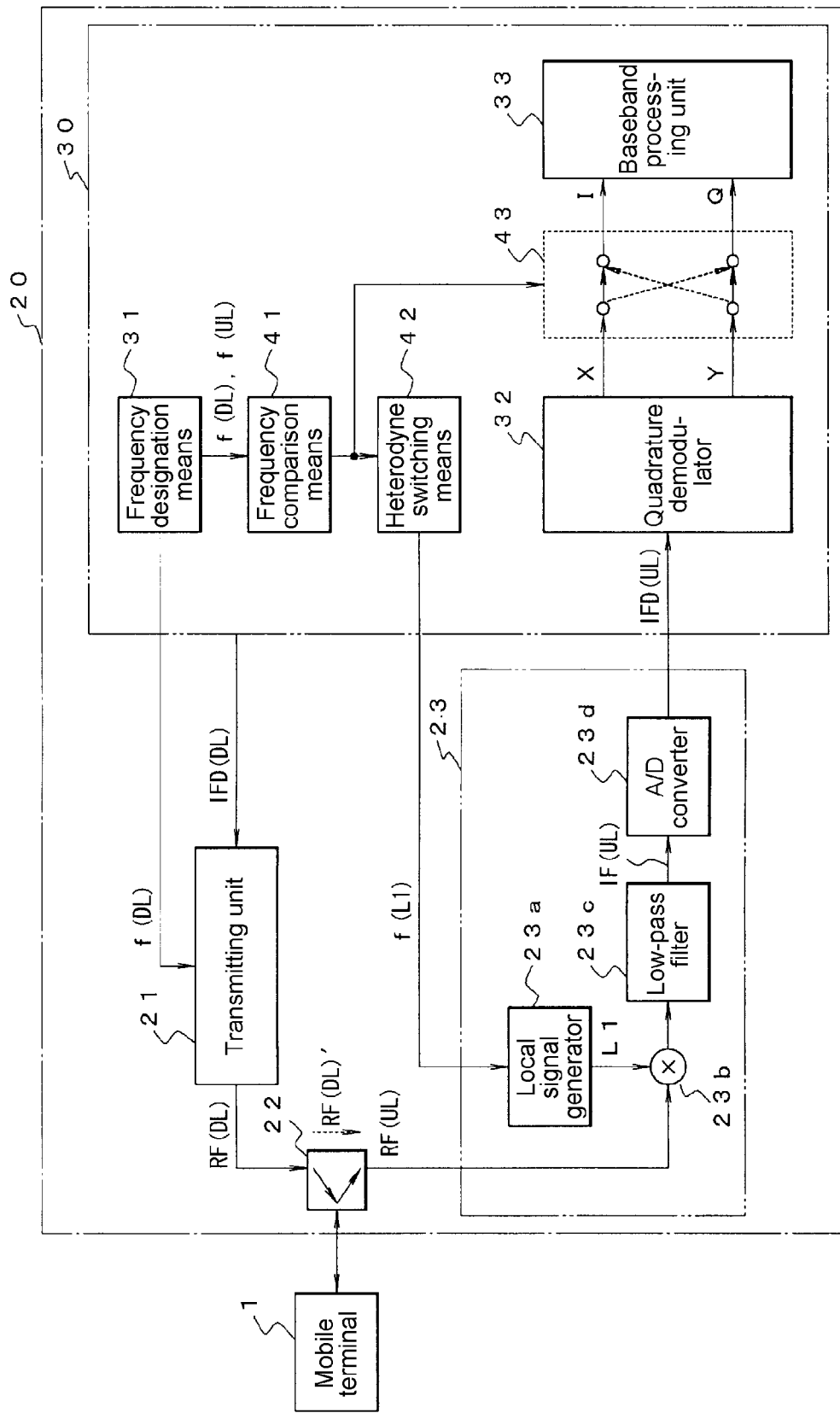
FIG. 1 is a diagram illustrating the structure of an embodiment of the invention.

FIG. 1 shows the structure of a mobile terminal test device (hereinafter, simply referred to as a test device) 20 according to the invention.

The test device 20 includes a transmitting unit 21, a coupler 22, a receiving unit 23, and a test processing unit 30.

The transmitting unit 21 generates a downlink (DL) radio-frequency signal RF(DL) to be sent to a mobile terminal 1 to be tested with a frequency f(DL) which is designated by the test processing unit 30 and outputs the DL radio-frequency signal RF(DL). The structure of the transmitting unit 21 may be any structure. For example, the test processing unit 30 converts a baseband signal into a signal in an intermediate frequency band using a quadrature modulator and sends the converted signal to the transmitting unit 21. Then, the transmitting unit 21 converts the signal IFD(DL) (quadrature-modulated signal) converted into the intermediate frequency band into an analog signal and performs heterodyne conversion so as to convert the frequency into the designated frequency f(DL).

In addition, a structure can be used which receives the baseband signal generated in the test processing unit 30, converts the received baseband signal into an analog baseband signal, performs quadrature modulation to convert the analog baseband signal into a local signal with the designated frequency f(DL), and directly generates the DL radio-frequency signal.

The coupler 22 is, for example, a directional coupler or a coupler with directionality, such as a circulator (a coupler without directionality may be used when the wave filtering function of a reception-side input filter is used due to the difference between transmission and reception frequencies), sends the DL radio-frequency signal RF(DL) output from the transmitting unit 21 to the mobile terminal 1, inputs an uplink (UL) radio-frequency signal RF(UL) output from the mobile terminal 1, and sends the UL radio-frequency signal RF(UL) to the receiving unit 23. However, as described above, the leakage of some signals RF(DL)' among the DL radio-frequency signals RF(DL) to the receiving unit 23 is inevitable.

The receiving unit 23 includes a local signal generator 23a, a mixer 23b, a low-pass filter 23c, and an A/D converter 23d.

The local signal generator 23a outputs, to the mixer 23b, a first local signal L1 which has a predetermined frequency f(IF) (for example, f(IF)=5 MHz) difference from the uplink frequency f(UL) designated by the test processing unit 30.

The mixer 23b mixes the signal which is input through the coupler 22 with the first local signal L1 and outputs a sum component and a difference component of the frequencies (in some cases, the sum component is removed by a filter (not shown)).

Among the signals output from the mixer 23b, a signal in the intermediate frequency band, which is the difference component, is extracted by the low-pass filter 23c. The cutoff frequency (higher cutoff frequency) of the low-pass filter 23c includes the predetermined frequency f(IF) and is set to, for example, about 15 MHz, considering the passage of a UL signal component with a predetermined bandwidth (for example, 5 MHz or 10 MHz) and the minimum gap between a UL frequency band and a DL frequency band of an operating band.

The signal IF(UL) in the intermediate frequency band which is output from the low-pass filter 23c is converted into a digital signal string IFD(UL) by the A/D converter 23d and is then output to the test processing unit 30.

The test processing unit 30 outputs various signals IFD (DL) required for a test to the transmitting unit 21, performs various kinds of signal processing on the output signal IFD (UL) from the receiving unit 23, and performs various types of control related to, for example, a frequency and a level on the transmitting unit 21 or the receiving unit 23. However, here, a portion of the signal processing performed on the output signal IFD(UL) from the receiving unit 23 and a structure for suppressing the influence of a DL leakage component when the mobile terminal 1 is tested in the FDD system will be described.

When the mobile terminal 1 is tested, frequency designation means 31 of the test processing unit 30 selects one of the operating bands shown in FIG. 9, which are used by the test device that simulates the base station to communicate with the mobile terminal 1 in the FDD system, and designates a UL frequency f(UL) and a DL frequency f(DL) used for a test from a UL frequency band and a DL frequency band of the selected operating band. The tester can use the difference between the frequencies f(UL) and f(DL) which is defined for each operating band as described above and can arbitrarily designate the frequencies f(UL) and f(DL) from the UL frequency band and the DL frequency band in order to evaluate the performance of the mobile terminal 1.

As described above, the transmitting unit 21 outputs a radio-frequency signal with the designated DL frequency f(DL).

Figure 2:
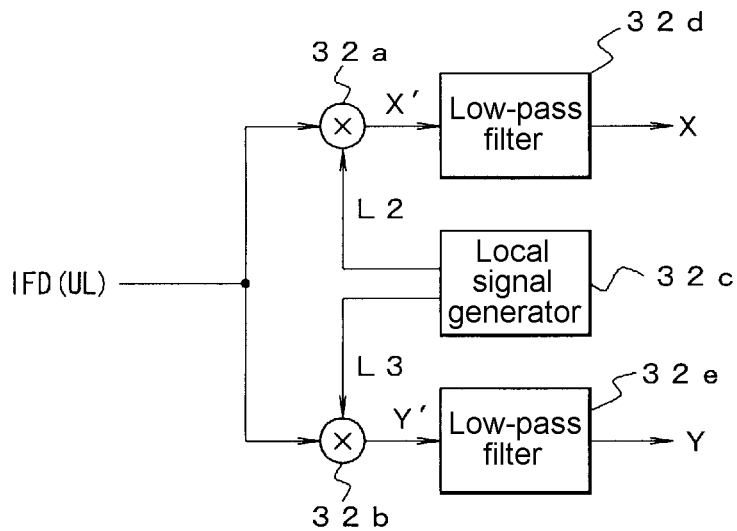
FIG. 2 is a diagram illustrating the structure of a main portion of the embodiment.

The output signal IFD(UL) from the receiving unit 23 is input to a digital (numeric-type) quadrature demodulator 32 which operates in synchronization with the sampling of the A/D converter 23d. As shown in FIG. 2, the quadrature demodulator 32 inputs an input signal to two mixers (multipliers) 32a and 32b, sends a second local signal L2=cos 2πf(IF)t output from a local signal generator (numerically-controlled oscillator) 32c to the mixer 32a, sends a third local signal L3=sin 2πf(IF)t obtained by shifting the second local signal L2 by 90 degrees to the mixer 32b, inputs the multiplied outputs X' and Y' of the mixers 32a and 32b to low-pass filters 32d and 32e in order to remove an unnecessary high-frequency component, and obtains baseband signals X and Y that are orthogonal to each other. The actual process is discrete. However, here, the process is described as a continuous process.

The baseband signals X and Y are output to a baseband processing unit 33 through baseband switching means 43 which will be described below.

The baseband processing unit 33 receives the baseband signals X and Y output from the quadrature demodulator 32 as an in-phase component I and a quadrature component Q of the baseband signal which is used for modulation in the transmission source, respectively, and performs various kinds of signal processing (for example, data demodulation) required for testing the mobile terminal 1 on the basis of these signals.

The test processing unit 30 includes frequency comparison means 41, heterodyne switching means 42, and baseband switching means 43 as a structure for suppressing the influence of a DL leakage component.

The frequency comparison means 41 compares the levels of the UL frequency f(UL) and the DL frequency f(DL) designated by the frequency designation means 31.

Figure 3:
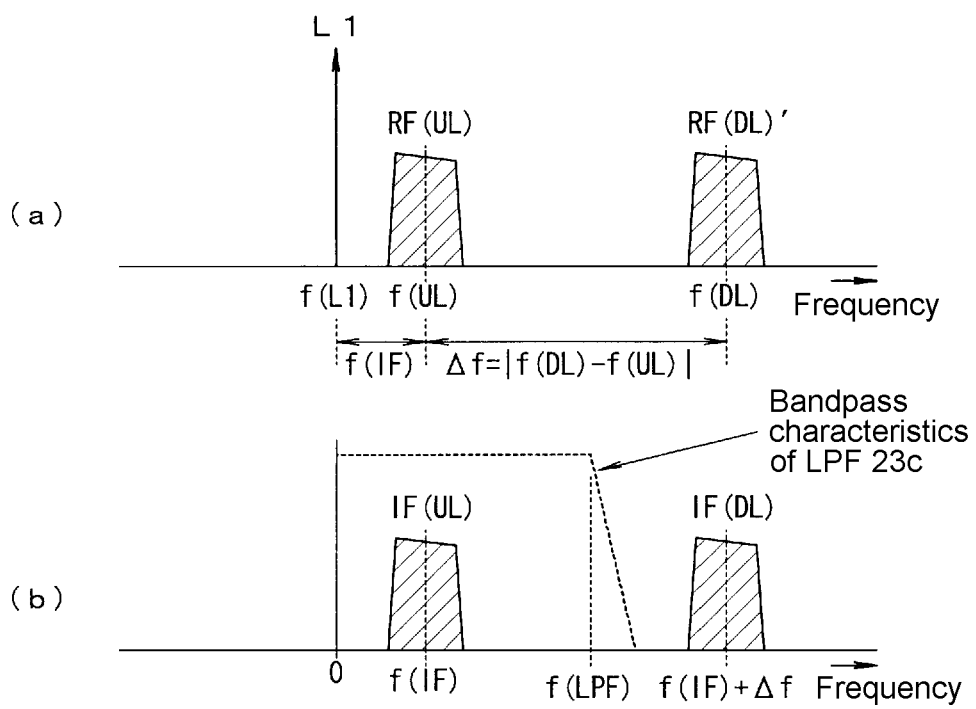
FIG. 3 is a diagram illustrating an operation when a lower-side heterodyne system according to the embodiment is used.

When the frequency comparison means 41 determines that the UL frequency f(UL) is lower than the DL frequency f(DL) as shown in FIG. 3(a), the heterodyne switching means 42 sets the frequency f(L1) of the first local signal L1 used by the receiving unit 23 to be lower than the UL frequency f(UL) by the predetermined frequency f(IF) such that the frequency of the UL signal is converted by a lower-side heterodyne system.

As shown in FIG. 3(b), through this process, the UL radio-frequency signal RF(UL) is converted into the intermediate-frequency signal IF(UL) with a frequency f(UL)−f(L1)=f(IF) in a positive frequency domain and a DL leakage component RF(UL)' is converted into a signal IF(DL) with a frequency f(IF)+Δf in a positive frequency domain f(DL)−f(L1) (where Δf is a frequency difference between UL and DL which is represented by |f(DL)−f(UL)|).

The upper limit frequency of the signal IF(UL) corresponds to the upper limit frequency of the UL frequency band of the operating band at a maximum, regardless of signal bandwidth, and the lower limit frequency of the DL leakage component IF(DL) corresponds to the lower limit frequency of the DL frequency band of the operating band at a minimum.

Among the operating bands in which the UL frequency band is lower than the DL frequency band, an operating band having the narrowest gap f(GAP) between the UL and DL frequency bands is operating band 8 with a band gap of 10 MHz. Therefore, the minimum frequency difference Δf between UL and DL which are arbitrarily set by the tester inevitably has a value obtained by adding the signal bandwidth (for example, 5 MHz) to the gap f(GAP)=10 MHz.

Therefore, as described above, when the UL signal band to be received is 5 MHz or 10 MHz, the cutoff frequency f(LPF) of the low-pass filter 23c is preferably set to about 15 MHz in order to transmit the UL signal component and to prevent the transmission of the DL leakage component, as shown in FIG. 3(b).

Figure 4:
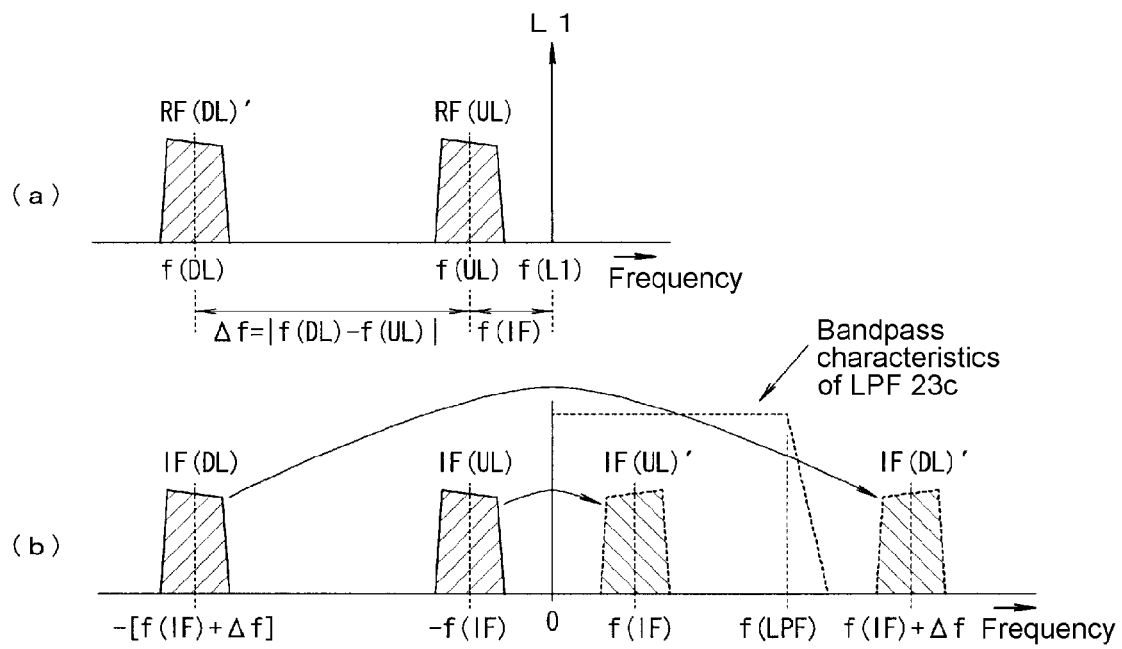
FIG. 4 is a diagram illustrating an operation when an upper-side heterodyne system according to the embodiment is used.

As shown in FIG. 4(a), when the frequency comparison means 41 determines that the UL frequency f(UL) is higher than the DL frequency f(DL), the frequency f(L1) of the first local signal L1 is set to be higher than the UL frequency f(UL) by the predetermined frequency f(IF) and frequency conversion is performed using an upper-side heterodyne system.

As shown in FIG. 4(b), by the above-mentioned process, the UL radio-frequency signal RF(UL) is converted into a signal IF(UL) with a frequency f(UL)−f(L1)=−f(IF) in the negative frequency domain and the DL leakage component RF(DL)' is converted into a signal IF(DL) with a frequency f(DL)−f(L1)=−[f(IF)+Δf] in the negative frequency domain. As the actual signals, the signals are symmetrically transferred with respect to a frequency of 0 and become a signal IF(UL)' with a frequency f(IF) and a signal IF(DL)' with a frequency f(IF)+Δf in the positive frequency domain.

The signals IF(UL)' and IF(DL)' which are symmetrically transferred to the positive frequency domain correspond to the signals IF(UL) and IF(DL) shown in FIG. 3(b). Here, among the operating bands in which the UL frequency band is higher than the DL frequency band, the operating band having the narrowest gap f(GAP) between the UL and DL frequency bands is operating band 20 with a band gap of 11 MHz. Therefore, the frequency difference Δf between UL and DL is inevitably greater than a value obtained by adding the signal bandwidth (for example, 5 MHz) to the gap f(GAP)=11 MHz and frequency conversion into the positive frequency domain in the intermediate frequency band is performed while maintaining the above-mentioned relationship.

Therefore, similarly to the above, as shown in FIG. 4(b), the low-pass filter 23c with a cutoff frequency f(LPF) of about 15 MHz can transmit the UL signal IF(UL)' and remove the DL leakage component IF(DL)'. However, the relationship between the frequency levels of the signal IF(UL)' which is symmetrically transferred from the negative frequency domain to the positive frequency domain and the original UL radio-frequency signal RF(UL) in the signal band is reversed (spectrums are reversed).

In all of the above-mentioned cases, the UL signals IF(UL) and IF(UL)' which have been converted into the intermediate frequency band pass through the low-pass filter 23c and are converted into a digital signal string IFD(UL) by the A/D converter 23d. The digital signal string IFD(UL) is input to the quadrature demodulator 32 and is converted into baseband signals X and Y which are orthogonal to each other by a multiplying process and a high-frequency cutoff process using the second local signal L2 and the third local signal L3 that have a frequency equal to the predetermined frequency f(IF) and have a phase difference of 90 degrees therebetween.

As described above, when the UL frequency f(UL) is lower than the DL frequency f(DL), the relationship between the frequency levels of the signal IF(UL) which is output from the low-pass filter 23c and the original UL radio-frequency signal RF(UL) in the signal band is maintained (the spectrums are equal to each other). Therefore, of the baseband signals X and Y obtained by the quadrature demodulation of the quadrature demodulator 32, the baseband signal X obtained by the multiplication of the second local signal L2=cos 2πf(IF)t is equivalent to the in-phase component I of the baseband signal (that is, the baseband signal used for modulation in the mobile terminal 1 which is a transmission source) obtained by modulating the original UL radio-frequency signal RF(UL) and the baseband signal Y obtained by the multiplication of the third local signal L3=sin 2πf(IF)t is equivalent to the quadrature component Q of the baseband signal (that is, the baseband signal used for modulation in the mobile terminal which is a transmission source) obtained by modulating the original UL radio-frequency signal RF(UL).

That is, the output signal IFD(UL) from the receiving unit 23 which is obtained by the lower-side heterodyne system can be represented by IFD(UL)=I·cos $\omega_i t$+Q·sin $\omega_i t$ (where 2fπf (IF)=$\omega_i$).

The quadrature demodulator 32 multiplies the output signal IFD(UL) by the local signals L2 and L3 to obtain the following X' and Y':

$$X' = IFD(UL) \cdot \cos\omega_i t$$
$$= I \cdot \cos\omega_i t \cdot \cos\omega_i t + Q \cdot \sin\omega_i t \cdot \cos\omega_i t$$
$$= I(\cos 2\omega_i t + \cos 0)/2 + Q(\sin 2\omega_i t + \sin 0)/2;$$

and $$Y' = IFD(UL) \cdot \sin\omega_i t$$
$$= I \cdot \cos\omega_i t \cdot \sin\omega_i t + Q \cdot \sin\omega_i t \cdot \sin\omega_i t$$
$$= I(\sin 2\omega_i t + \sin 0)/2 + Q(\cos 2\omega_i t + \cos 0)/2.$$

Here, since a component of the frequency $2\omega_i$ is removed by the low-pass filters 32d and 32e of the quadrature demodulator 32, the outputs X and Y from the quadrature demodulator 32 are as follows:

$X = I/2$; and $Y = Q/2$.

The baseband signal X which is obtained by the lower-side heterodyne system corresponds to the in-phase component I of the baseband signal obtained by modulating the original UL radio-frequency signal RF(UL) and the baseband signal Y which is obtained by the lower-side heterodyne system corresponds to the quadrature component Q of the baseband signal obtained by modulating the original UL radio-frequency signal RF(UL).

In contrast, as described above, when the UL frequency f(UL) is higher than the DL frequency f(DL) and the receiving unit 23 performs upper-side heterodyne frequency conversion, the relationship between the frequency levels of the signal IF(UL)' output from the low-pass filter 23c and the original UL radio-frequency signal RF(UL) in the signal band is reversed (spectrums are reversed).

As such, it has been known that, in the signal having a spectrum that is reverse to the spectrum of the original signal, the in-phase component I and the quadrature component Q are interchanged with each other as in the baseband signal obtained by modulating the original signal.

That is, the output signal IFD(UL) from the receiving unit 23 which is obtained by the upper-side heterodyne system can be represented as IFD(UL)=Q·cos $\omega_i t$+I·sin $\omega_i t$.

The quadrature demodulator 32 multiplies the output signal IFD(UL) by the local signals L2 and L3 to obtain the following X' and Y':

$$X' = IFD(UL) \cdot \cos\omega_i t$$
$$= Q \cdot \cos\omega_i t \cdot \cos\omega_i t + I \cdot \sin\omega_i t \cdot \cos\omega_i t$$
$$= Q(\cos 2\omega_i t + \cos 0)/2 + I(\sin 2\omega_i t + \sin 0)/2;$$

and $$Y' = IFD(UL) \cdot \sin\omega_i t$$
$$= Q \cdot \cos\omega_i t \cdot \sin\omega_i t + I \cdot \sin\omega_i t \cdot \sin\omega_i t$$
$$= Q(\sin 2\omega_i t + \sin 0)/2 + I(\cos 2\omega_i t + \cos 0)/2.$$

Similarly to the above, since a component of the frequency $2\omega_i$ is removed by the low-pass filters 32d and 32e of the quadrature demodulator 32, the outputs X and Y from the quadrature demodulator 32 are as follows:

$X = Q/2$; and $Y = I/2$.

As such, the baseband signal X which is obtained by the upper-side heterodyne system corresponds to the quadrature component Q of the baseband signal obtained by modulating the original UL radio-frequency signal RF(UL) and the baseband signal Y corresponds to the in-phase component I of the baseband signal obtained by modulating the original UL radio-frequency signal RF(UL).

Therefore, in the test device 20, as shown in FIG. 1, the baseband switching means 43 is provided between the quadrature demodulator 32 and the baseband processing unit 33. When it is determined that the UL frequency f(UL) is lower than the DL frequency f(DL), the baseband signal X and the baseband signal Y which are output from the quadrature demodulator 32 are input as the in-phase component I and the quadrature component Q to the baseband processing unit 33, respectively. When it is determined that the UL frequency f(UL) is higher than the DL frequency f(DL), the baseband signal X and the baseband signal Y which are output from the quadrature demodulator 32 are input as the quadrature component Q and the in-phase component I to the baseband processing unit 33, respectively.

According to this structure, even when the UL frequency f(UL) is determined to be higher than the DL frequency f(DL) and the upper-side heterodyne system is used, it is possible to accurately convert the UL signal into the baseband signal, without being affected by the DL leakage component.

In the above description, when it is determined that the UL frequency f(UL) is higher than the DL frequency f(DL), the upper-side heterodyne system is absolutely used. However, when there is a large frequency difference Δf between the UL frequency f(UL) and the DL frequency f(DL), the lower-side heterodyne system may be used for UL.

Figure 5:
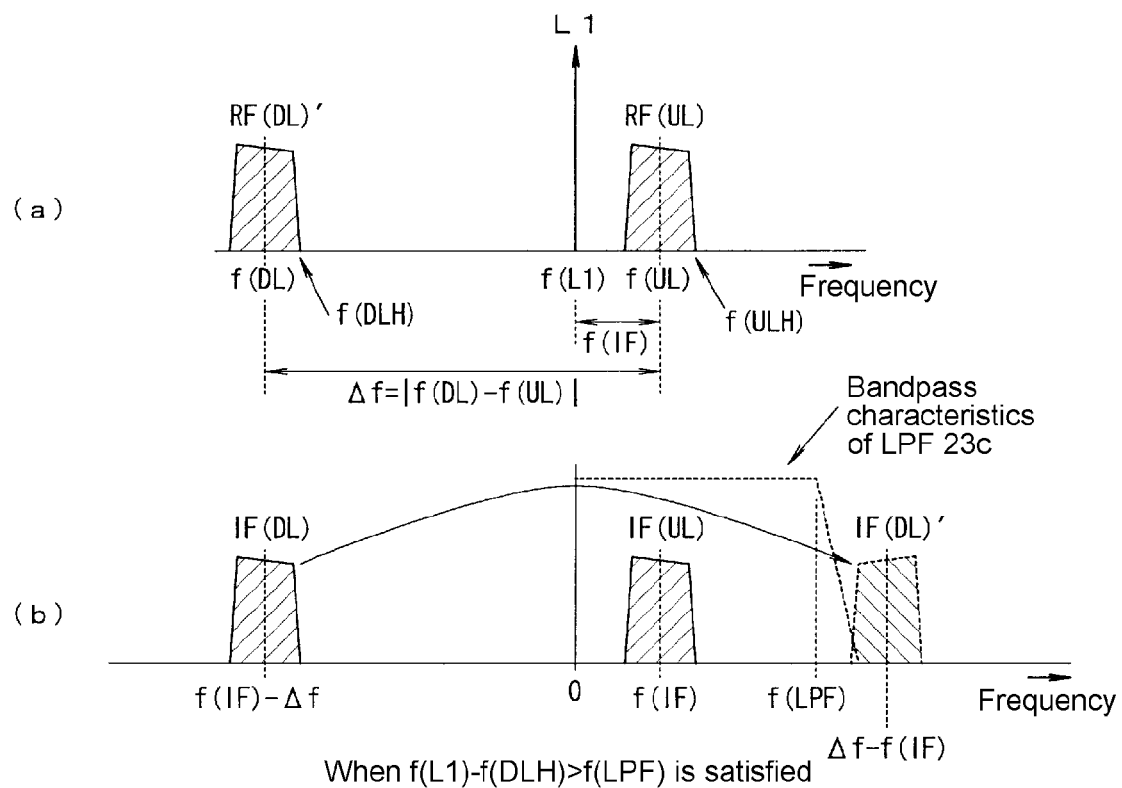
FIG. 5 is a diagram illustrating an operation when an uplink frequency is higher than a downlink frequency and the lower-side heterodyne system is used.

That is, as shown in FIG. 5(a), when the UL frequency f(UL) is higher than the DL frequency f(DL), the frequency of the first local signal L1 is set to a value that is lower than the UL frequency f(UL) by the predetermined frequency f(IF) and the frequency of the UL radio-frequency signal RF(UL) is converted into the intermediate frequency band by the lower-side heterodyne system.

The frequency of the UL radio-frequency signal RF(UL) is converted into the frequency f(IF) in the positive frequency domain by the lower-side heterodyne system, without reversing the spectrum. The frequency of the DL leakage component RF(DL)' is converted into the frequency f(DL)−f(L1) in the negative frequency domain by the upper-side heterodyne system, is symmetrically transferred with respect to a frequency of 0, and is converted into a frequency f(L1)−f(DL) in the positive frequency domain.

When the difference between the upper limit frequency f(DLH) of the leakage component RF(DL)' and the frequency f(L1) of the local signal is greater than the cutoff frequency f(LPF) of the low-pass filter 23c in the receiving unit 23, the leakage component IF(DL)' which is symmetrically transferred to the positive frequency domain is outside of the passband of the low-pass filter 23c and has no effect on the test, as shown in FIG. 5(b). Therefore, the same process as described above is preferably performed on the UL signal IF(UL) which has passed through the low-pass filter 23c.

When the condition that the leakage component IF(DL)' which is symmetrically transferred to the positive frequency domain does not overlap the UL signal IF(UL) on the frequency axis is calculated, the difference between the upper limit frequency f(ULH) of the UL radio-frequency signal RF(UL) and the frequency f(L1) of the local signal L1 is preferably equal to or less than the difference between the upper limit frequency f(DLH) of the DL radio-frequency signal RF(DL) and the frequency f(L1) of the local signal.

When the above-mentioned condition is satisfied, at least the leakage component IF(DL)' does not overlap the UL signal IF(UL) on the frequency axis. Therefore, it is possible to extract only the UL signal IF(UL) using a band limiting process of the baseband processing unit 33 and to perform various kinds of processing on the extracted UL signal IF(UL). However, this process can be applied when the level of the radio-frequency signal RF(DL)' which leaks to the receiving unit 23 is lower than the level of the UL radio-frequency signal RF(UL) and the input level of the A/D converter 23d is beyond the allowable range.

Figure 6:
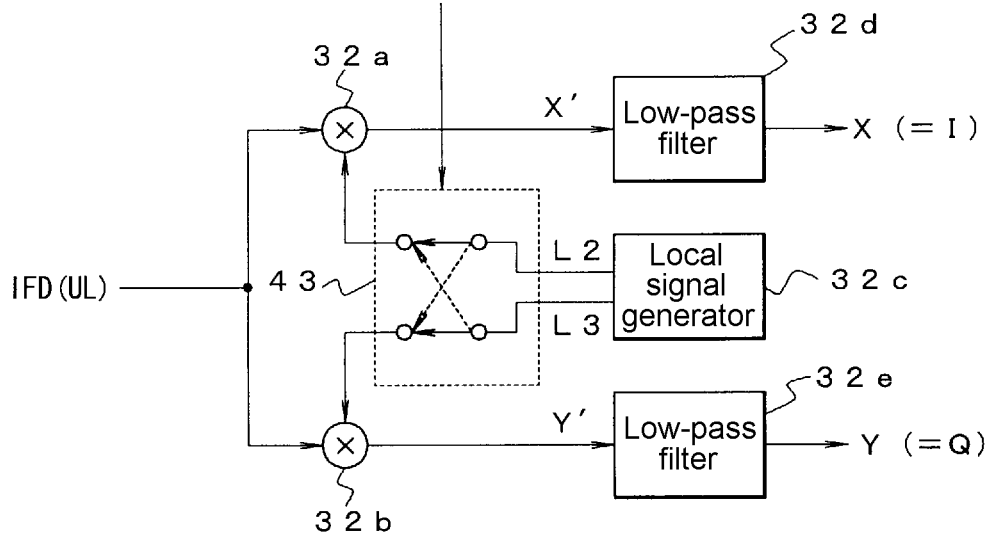
FIG. 6 is a diagram illustrating another baseband switching method.
Figure 7:
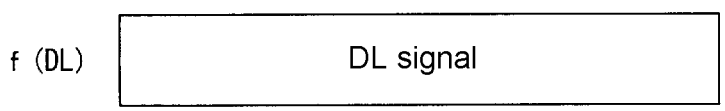
FIG. 7 is a diagram illustrating the relationship between the uplink and downlink of an FDD system.
Figure 7:
Figure 8:
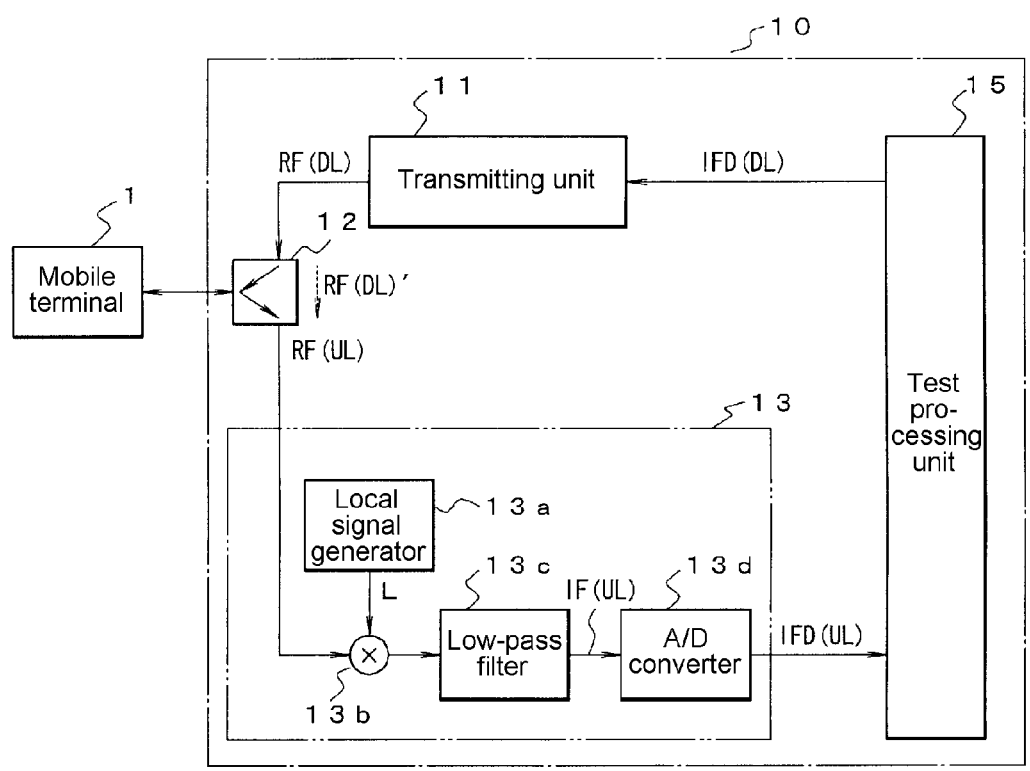
FIG. 8 is a diagram illustrating the structure of a device according to the related art.
Figure 10:
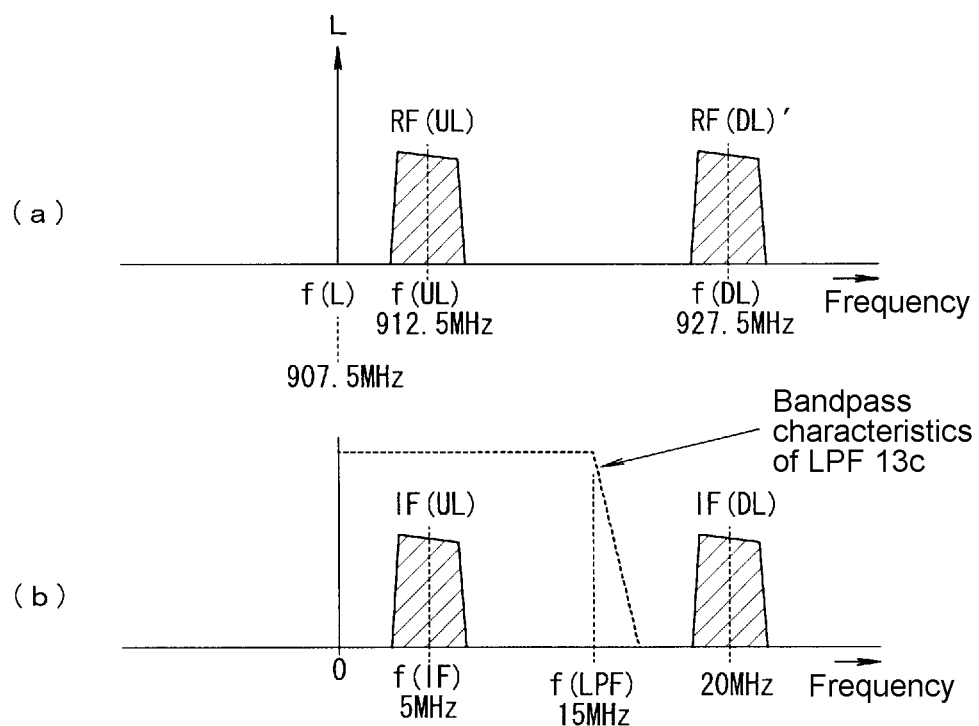
FIG. 10 is a diagram illustrating an operation when the uplink frequency is lower than the downlink frequency.
Figure 11:
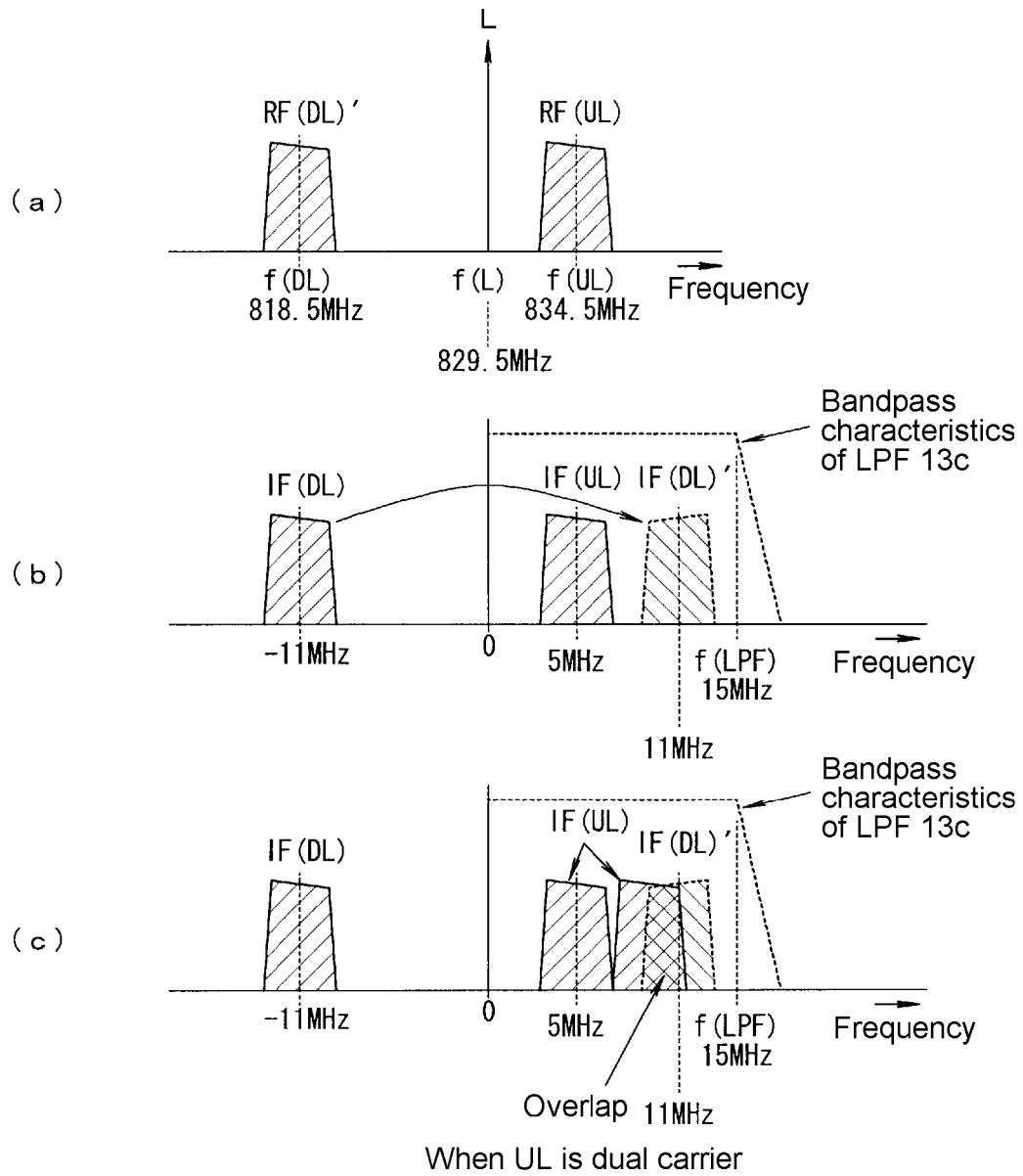
FIG. 11 is a diagram illustrating an operation when the uplink frequency is higher than the downlink frequency.

In the above-described embodiment, the baseband switching means 43 is provided between the quadrature demodulator 32 and the baseband processing unit 33 and interchanges the baseband signals X and Y output from the quadrature demodulator 32. However, as shown in FIG. 6, the baseband switching means 43 is provided between two mixers 32a and 32b and the local signal generator 32c of the quadrature demodulator 32. In the lower-side heterodyne system, the baseband switching means 43 inputs the local signal L2 to the mixer 32a and inputs the local signal L3 to the mixer 32b. In the upper-side heterodyne system, the baseband switching means 43 inputs the local signal L3 to the mixer 32a and inputs the local signal L2 to the mixer 32b. As such, it is possible to respond to spectrum inversion even in the local signal switching process of the quadrature demodulator 32, similarly to above.

DESCRIPTION OF REFERENCE NUMERALS AND SIGNS

1: MOBILE TERMINAL
20: MOBILE TERMINAL TEST DEVICE
21: TRANSMITTING UNIT
22: COUPLER
23: RECEIVING UNIT
23a: LOCAL SIGNAL GENERATOR
23b: MIXER
23c: LOW-PASS FILTER
23d: A/D CONVERTER
30: TEST PROCESSING UNIT
31: FREQUENCY DESIGNATION MEANS
32: QUADRATURE DEMODULATOR
32a, 32b: MIXER
32c: LOCAL SIGNAL GENERATOR
32d, 32e: LOW-PASS FILTER
33: BASEBAND PROCESSING UNIT
41: FREQUENCY COMPARISON MEANS
42: HETERODYNE SWITCHING MEANS
43: BASEBAND SWITCHING MEANS

What is claimed is:

1. A mobile terminal test device comprising:
frequency designation means for designating an uplink frequency and a downlink frequency which are used for communication based on an FDD system with a mobile terminal to be tested;
a transmitting unit that outputs a downlink signal to be sent to the mobile terminal with the designated frequency;
a coupler that sends the downlink signal output from the transmitting unit to the mobile terminal and inputs an uplink signal output from the mobile terminal;
a receiving unit that mixes the uplink signal input through the coupler with a first local signal which has a predetermined frequency difference from the designated uplink frequency, performs a high-frequency cutoff process on the mixed signal, performs heterodyne conversion on the input uplink signal to convert a frequency of the input uplink signal into a frequency in an intermediate frequency band including the predetermined frequency, converts the heterodyne-converted signal into a digital signal string, and outputs the digital signal string;
a quadrature demodulator that multiplies the output from the receiving unit by second and third local signals which have a frequency equal to the predetermined frequency and have a phase difference of 90 degrees therebetween and outputs baseband signals which are orthogonal to each other;
a baseband processing unit that receives the baseband signals orthogonal to each other which are output from the quadrature demodulator as an in-phase component and a quadrature component of a baseband signal obtained by modulating the uplink radio-frequency signal and performs signal processing required for testing the mobile terminal;
frequency comparison means for comparing the levels of the uplink and downlink frequencies designated by the frequency designation means;
heterodyne switching means for setting a frequency of the first local signal to be lower than the uplink frequency by the predetermined frequency such that frequency conversion is performed by a lower-side heterodyne system when the frequency comparison means determines that the uplink frequency is lower than the downlink frequency; and for setting the frequency of the first local signal to be higher than the uplink frequency by the predetermined frequency such that frequency conversion is performed by an upper-side heterodyne system when the frequency comparison means determines that the uplink frequency is higher than the downlink frequency; and baseband switching means for outputting one baseband signal obtained by the multiplication of the second local signal by the quadrature demodulator and the other baseband signal obtained by the multiplication of the third local signal by the quadrature demodulator as an in-phase component and a quadrature component to the baseband processing unit, respectively, when the frequency comparison means determines that the uplink frequency is lower than the downlink frequency; and for outputting the one baseband signal and the other baseband signal obtained by the quadrature demodulator as the quadrature component and the in-phase component to the baseband processing unit, respectively, when the frequency comparison means determines that the uplink frequency is higher than the downlink frequency.

2. The mobile terminal test device according to claim 1, wherein the quadrature demodulator outputs a first signal obtained by multiplying the output from the receiving unit by the second local signal and outputs a second signal obtained by multiplying the output from the receiving unit by the third local signal, when the frequency comparison means determines that the uplink frequency is lower than the downlink frequency, the baseband switching means outputs the first signal and the second signal as the in-phase component and the quadrature component to the baseband processing unit, respectively, and when the frequency comparison means determines that the uplink frequency is higher than the downlink frequency, the baseband switching means outputs the first signal and the second signal as the quadrature component and the in-phase component to the baseband processing unit, respectively.

3. The mobile terminal test device according to claim 1, wherein, when the frequency comparison means determines that the uplink frequency is lower than the downlink frequency, the baseband switching means outputs the baseband signal obtained by the multiplication of the output from the receiving unit and the second local signal by the quadrature demodulator and the baseband signal obtained by the multiplication of the output from the receiving unit and the third local signal by the quadrature demodulator as the in-phase component and the quadrature component to the baseband processing unit, respectively, and when the frequency comparison means determines that the uplink frequency is higher than the downlink frequency, the baseband switching means outputs the baseband signal obtained by the multiplication of the output from the receiving unit and the third local signal by the quadrature demodulator and the baseband signal obtained by the multiplication of the output from the receiving unit and the second local signal by the quadrature demodulator as the in-phase component and the quadrature component to the baseband processing unit, respectively.

4. The mobile terminal test device according to claim 1, wherein the communication based on the FDD system is communication based on a dual carrier system.

5. A mobile terminal test method comprising:

a step of designating an uplink frequency and a downlink frequency which are used for communication based on an FDD system with a mobile terminal to be tested;

a step of giving a downlink signal with the designated frequency to the mobile terminal, mixing an uplink signal output from the mobile terminal with a first local signal which has a predetermined frequency difference from the designated uplink frequency, performing a high-frequency cutoff process on the mixed signal, performing heterodyne conversion on the uplink signal to convert a frequency of the uplink signal into a frequency in an intermediate frequency band including the predetermined frequency, converting the heterodyne-converted signal into a digital signal string, and outputting the digital signal string;

a step of multiplying the digital signal string by second and third local signals which have a frequency equal to the predetermined frequency and have a phase difference of 90 degrees therebetween and outputting baseband signals which are orthogonal to each other;

a step of performing signal processing required for testing the mobile terminal, using the baseband signals which are orthogonal to each other as an in-phase component and a quadrature component of a baseband signal obtained by modulating the uplink radio-frequency signal;

a step of comparing the levels of the designated uplink and downlink frequencies; and a step of setting a frequency of the first local signal to be lower than the uplink frequency by the predetermined frequency such that frequency conversion is performed by a lower-side heterodyne system and performing signal processing required for the test, using one baseband signal obtained by the multiplication of the second local signal and the other baseband signal obtained by the multiplication of the third local signal in the step of outputting the baseband signals orthogonal to each other as the in-phase component and the quadrature component, respectively, when it is determined in the step of comparing the levels of the frequencies that the uplink frequency is lower than the downlink frequency; and of setting the frequency of the first local signal to be higher than the uplink frequency by the predetermined frequency such that frequency conversion is performed by an upper-side heterodyne system and performing the signal processing required for the test, using the one baseband signal and the other baseband signal obtained in the step of outputting the baseband signals orthogonal to each other as the in-phase component and the quadrature component, respectively, when it is determined in the step of comparing the levels of the frequencies that the uplink frequency is higher than the downlink frequency.

6. The mobile terminal test method according to claim 5, wherein the step of outputting the baseband signals orthogonal to each other outputs a first signal obtained by multiplying the digital signal string by the second local signal and outputs a second signal obtained by multiplying the digital signal string by the third local signal, when it is determined in the step of comparing the levels of the frequencies that the uplink frequency is lower than the downlink frequency, the step of performing the signal processing required for the test performs the signal processing required for the test, using the first signal and the second signal as the in-phase component and the quadrature component, respectively, and when it is determined in the step of comparing the levels of the frequencies that the uplink frequency is higher than the downlink frequency, the step of performing the signal processing required for the test performs the signal processing required for the test, using the first signal and the second signal as the quadrature component and the in-phase component, respectively.

7. The mobile terminal test method according to claim 5, wherein, when it is determined in the step of comparing the levels of the frequencies that the uplink frequency is lower than the downlink frequency, the step of performing the signal processing required for the test performs the signal processing required for the test, using the baseband signal obtained by the multiplication of the digital signal string and the second local signal and the baseband signal obtained by the multiplication of the digital signal string and the third local signal as the in-phase component and the quadrature component, respectively, and when it is determined in the step of comparing the levels of the frequencies that the uplink frequency is higher than the downlink frequency, the step of performing the signal processing required for the test performs the signal processing required for the test, using the baseband signal obtained by the multiplication of the digital signal string and the third local signal and the baseband signal obtained by the multiplication of the digital signal string and the second local signal as the in-phase component and the quadrature component, respectively.

8. The mobile terminal test method according to claim 5, wherein the communication based on the FDD system is communication based on a dual carrier system.

* * * * *